US009473044B2

United States Patent
Somani et al.

(10) Patent No.: US 9,473,044 B2
(45) Date of Patent: Oct. 18, 2016

(54) POWER INVERTER IMPLEMENTING PHASE SKIPPING CONTROL

(71) Applicant: University of Central Florida Research Foundation, Inc., Orlando, FL (US)

(72) Inventors: Utsav Somani, Orlando, FL (US); Ahmadreza Amirahmadi, Orlando, FL (US); Charles Jourdan, Orlando, FL (US); Issa Batarseh, Orlando, FL (US)

(73) Assignee: University of Central Research Foundation, Inc., Orlando, FL (US)

( * ) Notice: Subject to any disclaimer, the term of this patent is extended or adjusted under 35 U.S.C. 154(b) by 94 days.

(21) Appl. No.: 14/271,949

(22) Filed: May 7, 2014

(65) Prior Publication Data

US 2014/0334211 A1 Nov. 13, 2014

Related U.S. Application Data

(60) Provisional application No. 61/820,266, filed on May 7, 2013.

(51) Int. Cl.
 *H02M 7/537* (2006.01)
 *H02M 7/5387* (2007.01)
 (Continued)

(52) U.S. Cl.
 CPC ......... *H02M 7/53875* (2013.01); *H02M 7/537* (2013.01); *H02P 23/00* (2013.01); *H02P 27/02* (2013.01)

(58) Field of Classification Search
 CPC .................................... H20M 7/537
 USPC .................................. 363/131, 132
 See application file for complete search history.

(56) References Cited

U.S. PATENT DOCUMENTS

| 6,104,624 A | 8/2000 | Iwamoto et al. |
| 2004/0007998 A1* | 1/2004 | Yasohara ............... H02P 6/145 318/437 |

(Continued)

FOREIGN PATENT DOCUMENTS

| JP | H08331851 | 12/1996 |
| JP | 2002044959 | 2/2002 |

OTHER PUBLICATIONS

Haibing Hu, et al., "Efficiency Improvement of Grid-Tied Inverters at Low Input Power Using Pulse-Skipping Control Strategy", IEEE Transactions on Power Electronics, vol. 25, No. 12, Dec. 2010, pp. 3129-3138.

(Continued)

*Primary Examiner* — Matthew Nguyen
*Assistant Examiner* — Trinh Dang
(74) *Attorney, Agent, or Firm* — Jetter & Associates, P.A.

(57) ABSTRACT

A power inverter includes a DC/AC inverter having first, second and third phase circuitry coupled to receive power from a power source. A controller is coupled to a driver for each of the first, second and third phase circuitry (control input drivers). The controller includes an associated memory storing a phase skipping control algorithm, wherein the controller is coupled to receive updating information including a power level generated by the power source. The drivers are coupled to control inputs of the first, second and third phase circuitry, where the drivers are configured for receiving phase skipping control signals from the controller and outputting mode selection signals configured to dynamically select an operating mode for the DC/AC inverter from a Normal Control operation and a Phase Skipping Control operation which have different power injection patterns through the first, second and third phase circuitry depending upon the power level.

18 Claims, 11 Drawing Sheets

(51) Int. Cl.
*H02P 23/00* (2016.01)
*H02P 27/02* (2016.01)

(56) References Cited

U.S. PATENT DOCUMENTS

| | | | |
|---|---|---|---|
| 2006/0132102 A1* | 6/2006 | Harvey | G05F 1/67 320/166 |
| 2007/0145940 A1* | 6/2007 | Tsubota | H02M 7/53873 318/811 |
| 2007/0217239 A1 | 9/2007 | Rottger et al. | |
| 2009/0058341 A1* | 3/2009 | Lu | H02P 23/0036 318/504 |
| 2010/0308662 A1 | 12/2010 | Schatz et al. | |
| 2011/0179299 A1* | 7/2011 | Piwonka | G06F 1/3203 713/323 |
| 2012/0206118 A1* | 8/2012 | Williams | H02J 3/385 323/282 |
| 2013/0147459 A1* | 6/2013 | Kim | B60L 3/0038 323/351 |
| 2014/0097687 A1* | 4/2014 | Park | H02J 3/385 307/43 |
| 2014/0170999 A1* | 6/2014 | Aparin | H03G 3/3078 455/132 |

OTHER PUBLICATIONS

Utsav Somani, et al., "Phase Skipping Control to Improve Light Load Efficiency of Three Phase Micro-Inverters", 2014 Twenty-Ninth Annual IEEE Applied Power Electronics Conference and Exposition (APEC), Fort Worth, TX, Mar. 16-20, 2014, pp. 2944-2949.

* cited by examiner

POWER INVERTER IMPLEMENTING PHASE SKIPPING CONTROL

CROSS REFERENCE TO RELATED APPLICATIONS

This application claims the benefit of Provisional Application Ser. No. 61/820,266 entitled "PHASE SKIPPING CONTROL TO IMPROVE LIGHT LOAD EFFICIENCY OF THREE-PHASE GRID TIED MICRO-INVERTER", filed May 7, 2013, which is herein incorporated by reference in its entirety.

STATEMENT REGARDING FEDERALLY SPONSORED RESEARCH OR DEVELOPMENT

This invention was made with U.S. Government support under DOE Award Number: DE-EE0003176 awarded by the U.S. Department of Energy (DOE). The U.S. Government has certain rights in this invention.

FIELD

Disclosed embodiments relate to power inverters, more specifically to three-phase DC to AC power converters.

BACKGROUND

A power converter's efficiency (AC-DC or DC-DC) is determined by comparing its input power to its output power. For example, the efficiency of a power converter that provides 500 W of output power (Pout) and requires 625 W for the input power (Pin), is 80% (500 W/625 W=0.80). In this case, the input power exceeds the output power by 125 W or 20%, which is "wasted" power that is converted to heat energy which must be removed from the power converter by some cooling mechanism, such as thermal conduction, convection, and/or radiation.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize the power efficiency of power converter circuits at heavier loads (as a % of their full load capacity) is generally higher than their power efficiency at lighter loads. For example, for power inverters the typical power efficiency can decrease significantly for relatively low loads, having a transition power level from high efficiency operation to low efficiency operation that generally varies from power converter to power converter, which typically may be from 20% to 50% of their full load capacity.

In one particular application, that being in a grid tied solar power system, system efficiency is one of the most important system design requirements. The solar power available that can be harnessed as electrical power is also highly variable as there may be time varying sunlight attenuators present such cloud cover, dust, or partial shading of the photovoltaic (PV) cells of the panels due to tree leaves so that the maximum power that can be extracted from the PV panels is low resulting in the power converter operating at a light load. Poor light load performance is recognized to reduce overall power generation system efficiency. Hence, improving light load efficiency is one of the key challenges in a solar power systems, as well as other power systems that are based on significantly time-varying (variable) power sources including wind power systems, tidal power systems, and general AC-DC charging systems, such as three-phase industrial AC-DC chargers when the batteries are close to being fully charged (creating a light load).

Disclosed embodiments address the problem of low light load efficiency for power inverters (generally referred to herein as "micro-inverters") by providing a two-level control scheme (including Level 1 and Level 2) comprising phase skipping as one of the levels (referred herein as being Level 2), with its implementation proven to achieve significantly improved light load efficiency for a three-phase micro-inverter, such as a three-phase grid tied micro-inverter. A three-phase grid tied micro-inverter can have a single stage or two stages. When configured with two stages, there can be a DC/DC stage that receives power from a variable power source (photovoltaic (PV) panel, wind turbine or tidal turbine) in series with a mains side three-phase DC/AC power inverter (output) stage.

Disclosed phase skipping selectively injects power through each of the phases of the DC/AC inverter individually depending upon the currently available power from the variable power source, generally described herein as being a solar source including PV panels, although as noted above disclosed embodiments are applicable to other power sources including wind sources and tidal sources. This dynamic selective injection of power ensures that whenever a given phase receives power, it operates at greater than a preset percentage of load capacity which has been found to significantly improve the micro-inverter's power efficiency.

This Disclosure also includes methods to compensate for unbalancing between the three phases introduced due to selective injection of three-phase power. This control technique has two levels of operation, normal control where all phases inject power, and phase skipping control where at least one phase does not inject power. The operating mode can be determined by determining the total power available from the PV panel(s) or wind turbine(s) or tidal turbine(s), and applying control signals to the control inputs of the semiconductor power switches in the DC/AC inverter configured to implement phase skipping of at least one of the phases.

As used herein, the term "semiconductor power switches" includes field effect transistors (FETs), bipolar junction transistors (BJTs) and Insulated Gate Bipolar Transistor (IGBTs). FETs and IGBTs have gates as their control input, while BJTs have a base as their control input. Thus, although the specific semiconductor switches shown herein are generally Metal Oxide Semiconductor FET (MOSFET) switches, it is understood the semiconductor power switches can generally be any type of semiconductor power switch.

BRIEF DESCRIPTION OF THE DRAWINGS

FIG. 4A shows a depiction of a simplified three-phase grid micro-inverter block diagram according to an example embodiment receiving power from a variable power source, while

DETAILED DESCRIPTION

Figure 1:
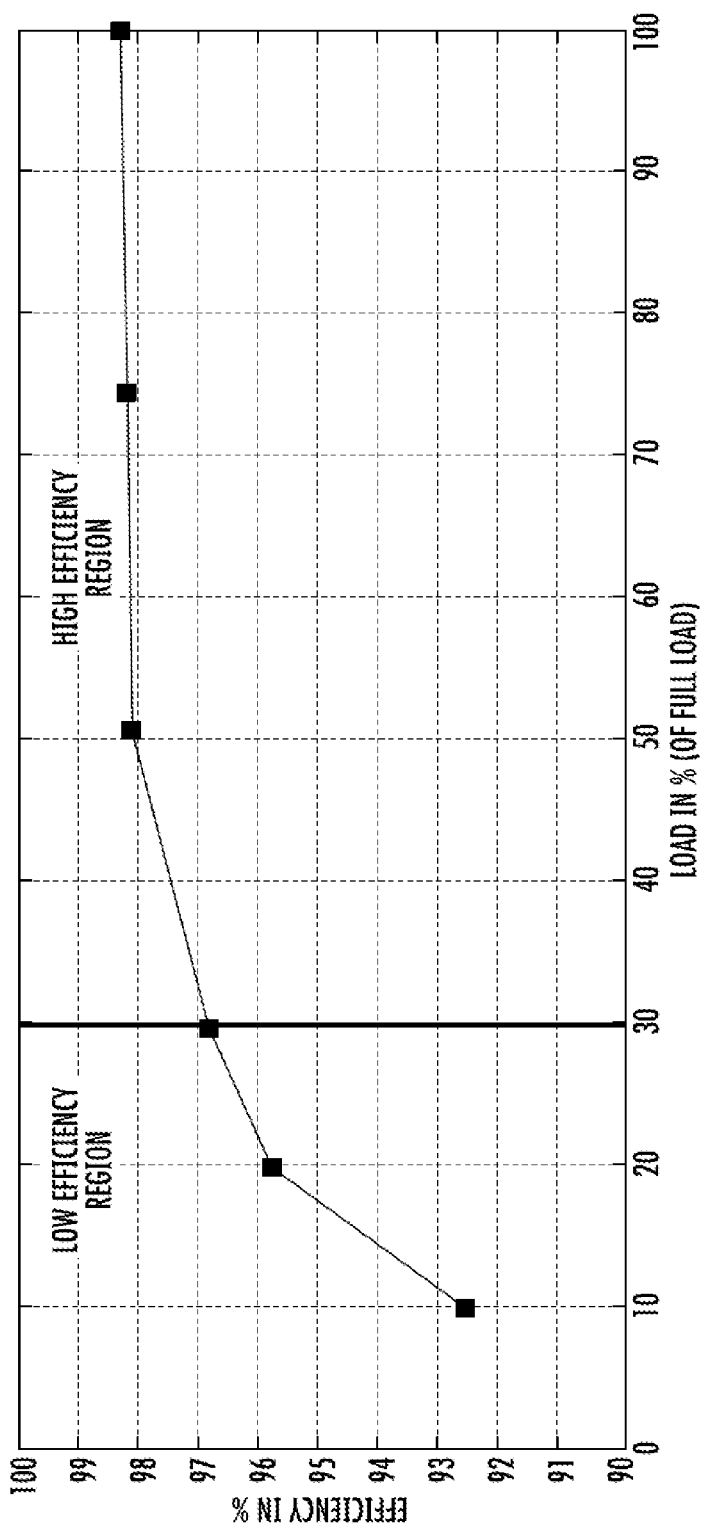
FIG. 1 is a graph showing the power efficiency vs. load % (of full load) performance for an example 400 W three-phase micro-inverter.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 is a graph showing % power efficiency vs. load % (of full (100%) load) performance for an example 400 W three-phase grid tie micro-inverter. It can be seen that in order to achieve a power efficiency of 97.5% of the full load efficiency the power inverter should be operated at a load % greater than about 30%. The "low efficiency region" is shown for operation at load %'s less than 30% while a "high efficiency region" is shown for operation at load %'s greater than about 30%, such as greater than 33% in one particular embodiment. For solar applications, the load at which micro-inverter is operated is recognized to be almost solely a function of the solar irradiation level which is known to vary significantly throughout the daytime.

A disclosed phase skipping technique monitors the input power available to inject into the DC/AC inverter and once the available power is less than a predetermined % shown as 30% (for example) of the total load capacity shown in FIG. 1, phase skipping shuts down at least one phase selected from Phase A, Phase B and Phase C circuitry, generally described herein as shutting down 2 out of 3 phases of the micro-inverter. Shutting down two of the phases diverts the power that would otherwise go to these phases onto a single phase which now operates in this example at about 90% (3*30%) of its per phase load capacity instead of 30% of its per phase load capacity when conventionally running all three Phases. Thus, in this example, the entire available power is converted using only single phase circuitry which is operating at up to 90% of its per phase capacity and thereby at an efficiency corresponding to a 90% load. This mode of operation where Phase circuitry for one or more phases are shut down is referred to herein as "phase skipping".

Figure 2A:
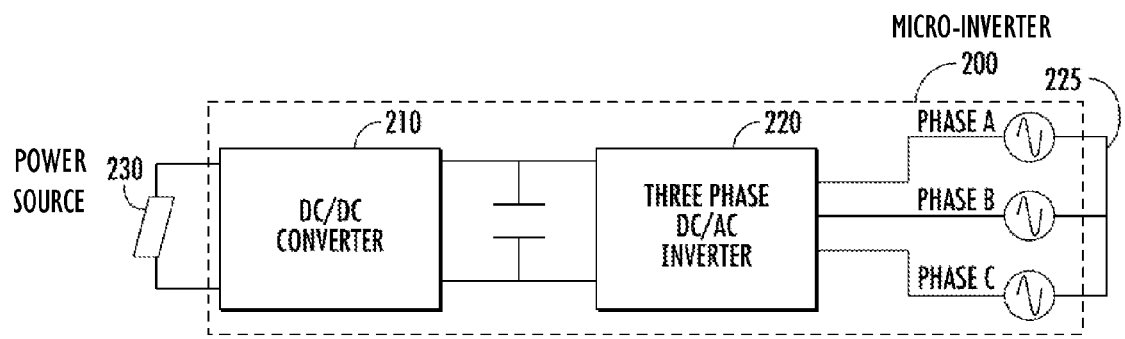
FIG. 2A shows a depiction of a simplified three-phase micro-inverter having two stages including a DC/DC converter stage receiving power from a variable power source shown as a PV panel in series with a three-phase mains side DC/AC inverter stage providing Phase A, phase B, and Phase C, according to an example embodiment.

FIG. 2A shows a depiction of a simplified three-phase grid tied micro-inverter (micro-inverter) 200 having two stages according to an example embodiment receiving power from a variable power source 230 shown as a PV panel, that as noted above can also be or a wind turbine(s) or tidal turbine(s). The micro-inverter 200 includes a DC/DC converter stage (DC/DC converter) 210 in series with a three-phase (Phase A, phase B and Phase C) mains side DC/AC inverter stage (DC/AC inverter) 220 that outputs the respective phases to a power grid (grid) 225. The DC/DC converter 210 provides the function of voltage regulation by performing up or down conversion of the input voltage received (i.e., depending upon the voltage level available from the PV panel(s) or wind/tidal turbines) to a suitable essentially constant DC voltage (e.g., 400V DC in this example). For certain designs, the DC/DC converter 210 together with a suitable controller can implement Maximum Power Point Tracking (MPPT) in order to extract maximum available power from the power source 230. The essentially constant DC voltage at the output of the DC/DC converter 210 is inverted into AC by the mains side DC/AC inverter 220. The DC-DC conversion functions to boost low voltage DC provided by the power source 230.

Although the micro-inverter 200 in FIG. 2 is shown having two stages, as noted above, the micro-inverter can also be configured as a single stage. There are known topologies where the DC/DC converter, MPPT and the DC/AC inverter can be included in a single stage. However, disclosed embodiments recognize there are certain disadvantages to the single stage micro-inverter such as inability to inject reactive power into the grid, and also single stage micro-inverters tend to draw AC current from the power source while performing MPPT which reduces the maximum power available from the power source.

Figure 2B:
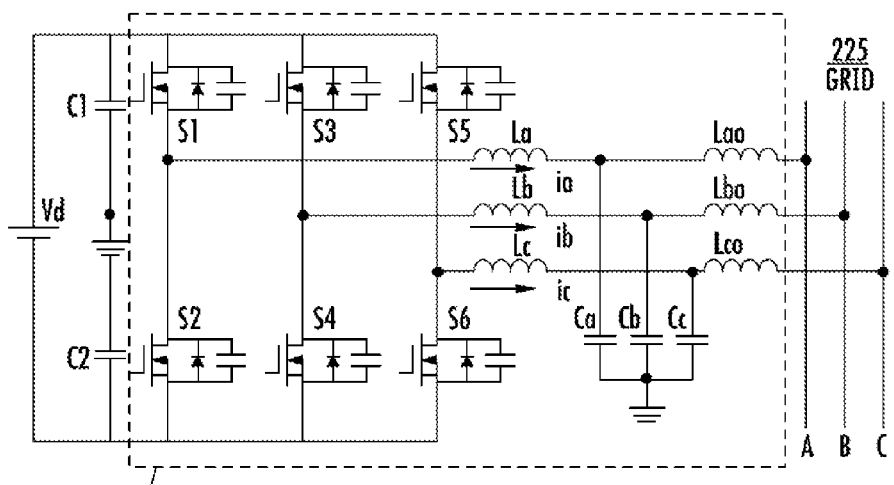
FIG. 2B shows a conceptual diagram during the operation mode of Level 1 where all three phases, Phase A, phase B and Phase C are active (normal control).

FIG. 2B shows a conceptual diagram of example circuitry of the DC/AC inverter 220 during Level 1 operation (normal operation) where Phase A, Phase B and Phase C are all active, with currents ia, ib and ic shown being output by the mains side DC/AC inverter 220 to the grid 225. The output from the DC/DC converter stage 210 is shown as a DC voltage Vd. The mains side DC/AC inverter 220 includes Phase A circuitry including semiconductor power switches shown as MOSFET switches S1 and S2 (and a reactive network) that outputs current ia, Phase B circuitry including semiconductor power switches shown as MOSFET switches S3 and S4 (and a reactive network) that outputs current ib, and Phase C circuitry including semiconductor power switches shown as MOSFET switches S5 and S6 (and a reactive network) that outputs current ic. As noted above, the semiconductor power switches S1 to S6 may also comprise BJTs and IGBTs.

Figure 2C:
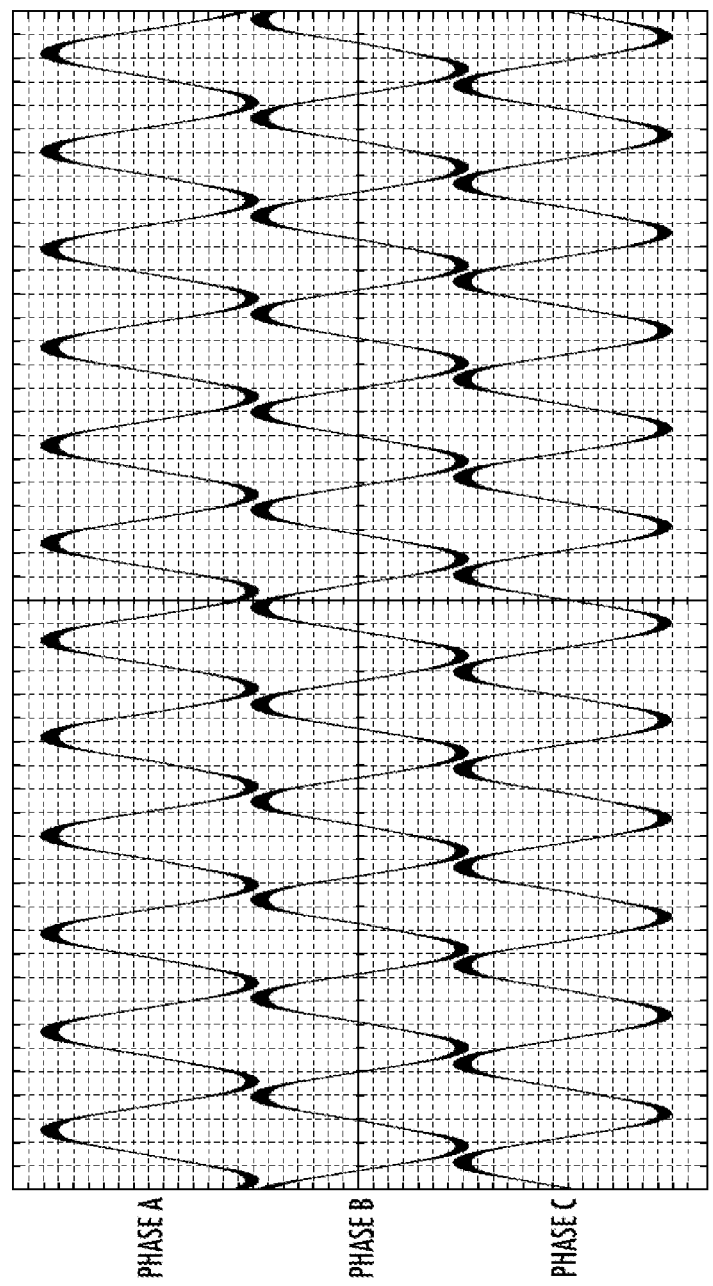
FIG. 2C shows the three output currents provided by the DC/AC inverter as a function of time for the respective phases under normal control.

The MOSFET switches S1 to S6 are shown conventionally configured to have their body diodes parallel to the source-to-drain path by shorting the source to the body of the MOSFET. Gate drivers for driving the gates of the MOSFET switches S1 to S6 are not shown in FIG. 2B (see FIG. 3A described below). Level 1 thus represents normal DC/AC inverter 220 control (e.g., Power=30% to 100% of the total rated power). FIG. 2C shows the output current of the three phases provided by the DC/AC inverter 220 to the grid 225 all being the same amplitude and frequency.

Figure 3A:
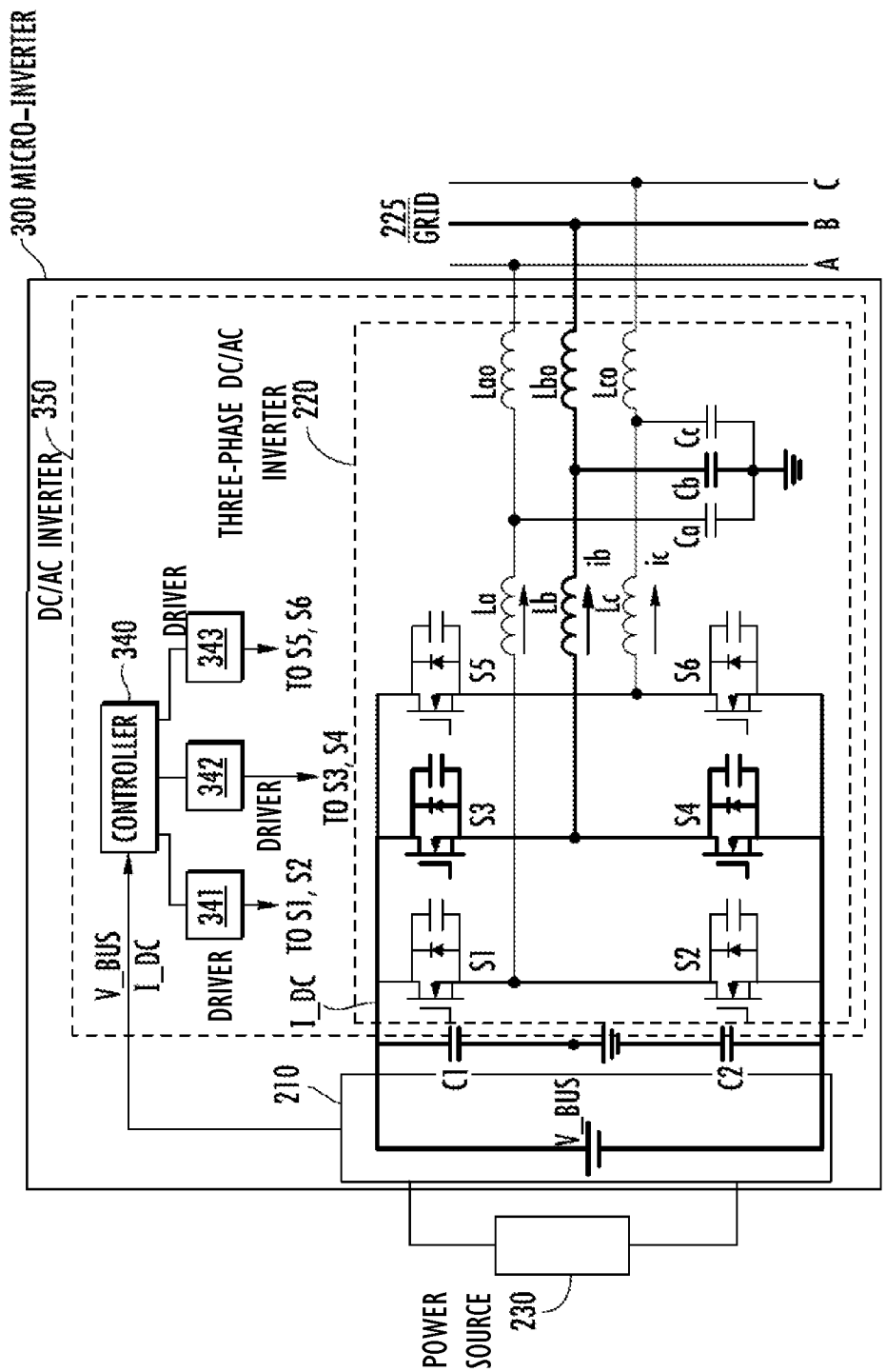
FIG. 3A shows a conceptual diagram of an example micro-inverter including a disclosed DC/AC inverter, a controller, and phase A, B and C control input drivers shown as gate drivers coupled to gates of the MOSFET switches in the mains side DC/AC inverter implementing disclosed "phase skipping" operation during low power conditions, according to an example embodiment, where Phases A and C are "skipped".

As described above, in disclosed embodiments depending upon the power available from the PV panel(s) or wind/tidal turbine(s) either Level 1 (normal operation) or Level 2 (phase skipping) is implemented. FIG. 3A shows a conceptual diagram of an example micro-inverter 300 including a DC/AC inverter 350 including a controller 340 and a control input driver(s) 341 shown for Phase A circuitry, control input driver(s) 342 shown for Phase B circuitry and control input driver(s) 343 for Phase C circuitry)-shown coupled to the gates of the MOSFET switches (S1 to S6) in the mains side DC/AC inverter 220 implementing the "phase skipping" mode of operation during low available power conditions, according to an example embodiment. As known in the art, each control input driver (e.g., gate driver) shown can include a high side driver and a low side driver. As used above, the power source is shown as 230, the DC/DC converter as 210, and the grid as 225.

As shown in FIG. 3A, Phase B circuitry including MOSFET switches S3 and S4 and reactive circuitry which outputs current ib to the grid 225 is the only active phase, while Phase A circuitry including MOSFET switches S1 and S2 and reactive circuitry that when operating outputs current is and Phase C circuitry that includes MOSFET switches S5 and S6 and reactive circuitry that when operating outputs current is are both shut down (not injecting any current). Phases can be shut down by applying a suitable control input drive signal (e.g., gate drive signal) to the gates of the MOSFET switches (S1 to S6) to turn off the series connected switches in any of the phase circuits.

By modulating the power being injected through each of the phase circuitry (Phase A, Phase B and Phase C) of the mains side DC/AC inverter 220 during Level 2 operation (disclosed phase skipping) so that only one phase shown in FIG. 3A as Phase B is active has been found to improves the light load efficiency by about 3.5% to 4%. This effectively halves the amount power loss as shown relative to FIG. 1 by moving the operating point of the Phases from 30% of their per phase load capacity (normal control) to a 90% phase load capacity for the selected Phase by having all the available power injected through the selected Phase.

Figure 3B:
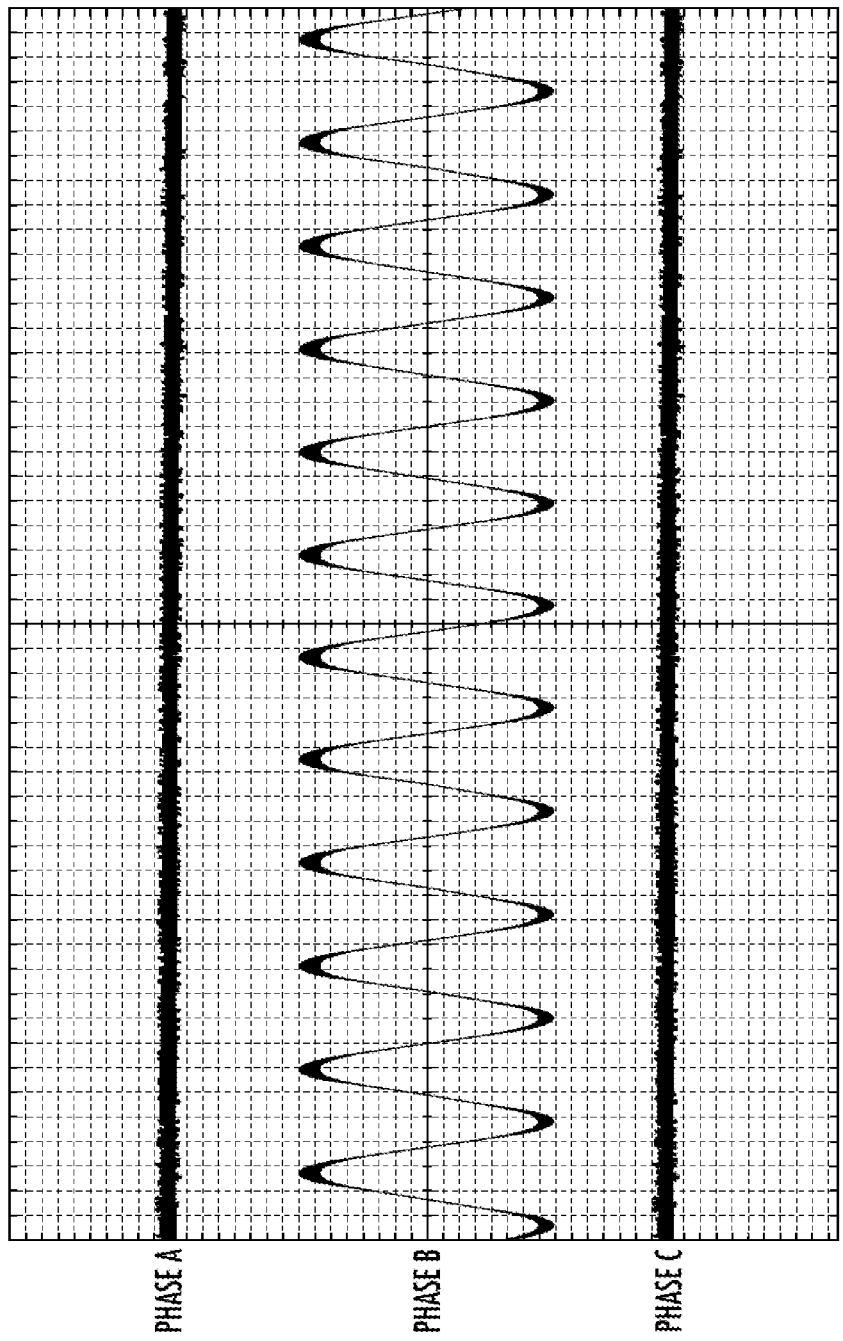
FIG. 3B shows that the output current injected into the grid is only through one of the phases shown as Phase B with current $i_b$.

For example, phase skipping can be implemented when the power available from the power source is from 5% to 35% of the total rated power of the 3-phase DC/AC inverter (full load capacity), or in one particular embodiment the power available from the power source is <33% of the total rated power. As can be seen from FIG. 1, the power efficiency of the example three-phase micro-inverter is shown dropping rapidly when the load % of full load capacity is less than about 30% of the full load capacity. FIG. 3B shows phase skipping mode operation in operation where all the current injected into the grid 225 comes from only one of the Phases shown as Phase B.

Figure 4A:
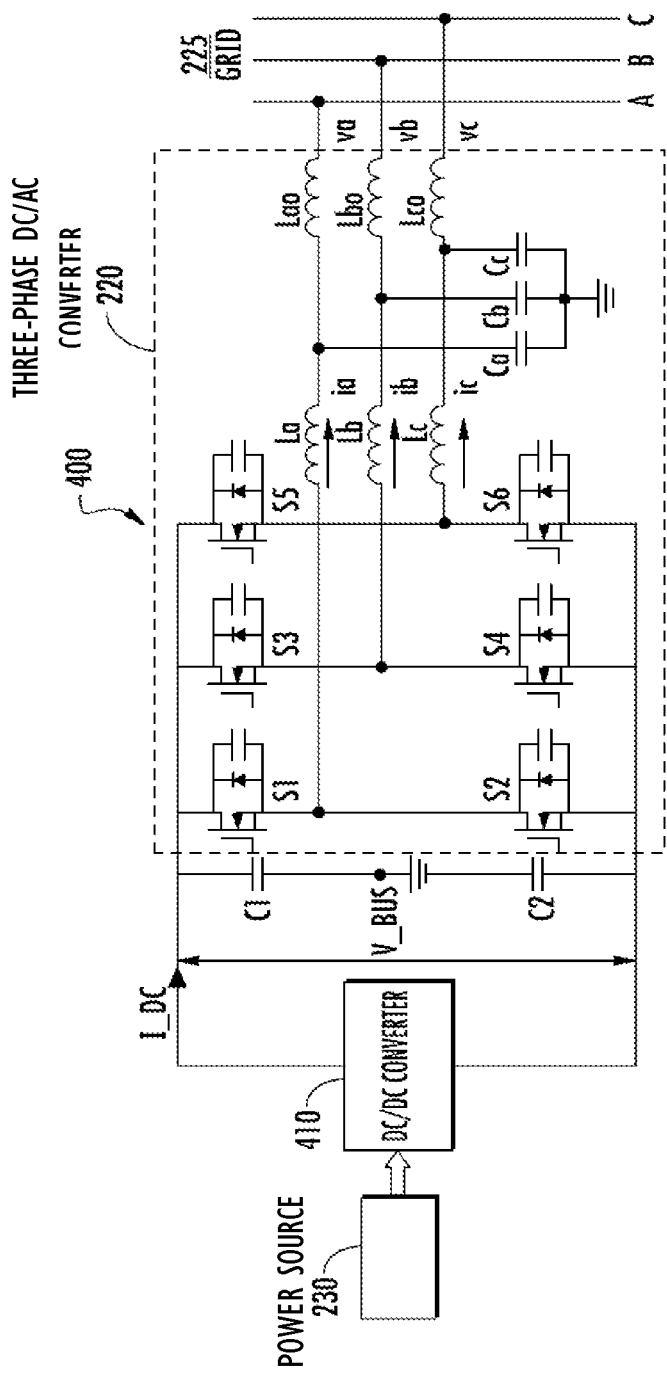

FIG. 4A shows a depiction of a simplified three-phase grid tied micro-inverter 400 according to an example embodiment receiving power from a variable power source 230 that can comprise PV panel(s) or wind/tidal turbine(s). The three-phase grid tied micro-inverter 400 is a two stage micro-inverter, includes a DC/DC converter stage 410 implementing MPPT and voltage regulation (controller not shown) in series with a three-phase (Phase A, phase B and Phase C) DC/AC inverter 220 that outputs currents from the respective phases to grid 225. The DC/AC inverter 220 performs the operation of bus regulation and maintains the bus voltage (V_bus) at some predetermined voltage, such as 400V. The disclosed phase skipping algorithm that can be implemented on single or two stage micro-inverter as long as the respective phases of the inverter can be individually controlled.

Figure 4B:
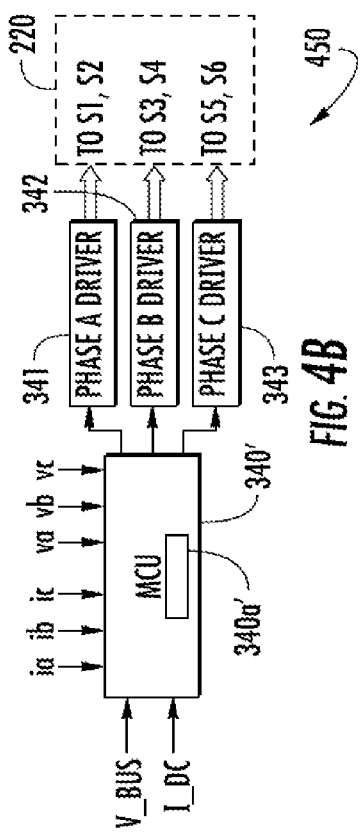
FIG. 4B shows an example control scheme implementation including a microcontroller unit (MCU) for implementing a disclosed phase skipping control algorithm.

FIG. 4B shows an example control scheme implementation 450 including a MCU 340' for implementing disclosed phase skipping control algorithm that can be stored in a memory 340a' associated with the MCU 340'. An MPPT algorithm may also be stored in memory 340a'. Phase currents ia, ib, is and phase voltages va, vb, vc are shown as inputs to the MCU 340' for monitoring, protection and telemetry purposes, as well as the V_bus and the current I_dc. The MCU 340' monitors these signals and initiates protective action when an over/under voltage and/or over/under current fault occurs. The telemetry function involves transmitting information, such as injected power, temperature, health data and faults that have occurred, to a central controller.

Specifically, based on the current value of V_bus and current I_dc drawn by the mains side DC/AC inverter 220, the available DC power (=V_bus x current I_dc) is calculated by MCU 340'. If the available DC power calculated represents greater than a predetermined % of the total load capacity of the DC/AC inverter 220, such as ≥30% of the total load capacity for each phase in one particular embodiment, the DC/AC inverter 220 is controlled by MCU 340' via appropriate control signals. The control signals shown include control signals to Phase A control input driver(s) 341, Phase B control input driver(s) 342, and Phase C control input driver(s) 343, which in response outputs pulse width modulation (PWM) gate drive signals which are coupled to the gates of the MOSFET switches (e.g., Phase A control input driver(s) 341 to the gates of S1 and S2, etc.) to operate in Level 1 (Normal Control) where DC/AC inverter 220 has all three phases active and injecting an equal amount of power to the grid 225.

Once the available power level drops below a predetermined % of the total load capacity such as 30% of the total load capacity for each Phase in the example used herein, the MCU 340' recognizes this condition and in response sends control signals to the Phase A control input driver(s) 341, Phase B control input driver(s) 342, and Phase C control input driver(s) 343, which then sends appropriate control signals (PWM signals) to the gates of the MOSFET switches (S1 to S6) so that the mains side DC/AC inverter 220 operates in Level 2 with only a single phase active (phase skipping mode). The MCU 340' can thus initiate operation in the phase skipping mode by shutting down two of the phases, such as for enhancement mode MOSFET switches S1 to S6 by disabling at least one of the gate drive signals from the Phase A control input driver(s) 341 to the MOSFET gates of switches S1 and S2, the gate drive signals from the Phase B control input driver(s) 342 to the MOSFET gates of switches S3 and S4, and the gate drive signals from the Phase C control input driver (s) 343 to MOSFET gates of the switches S5 and S6.

Figure 5:
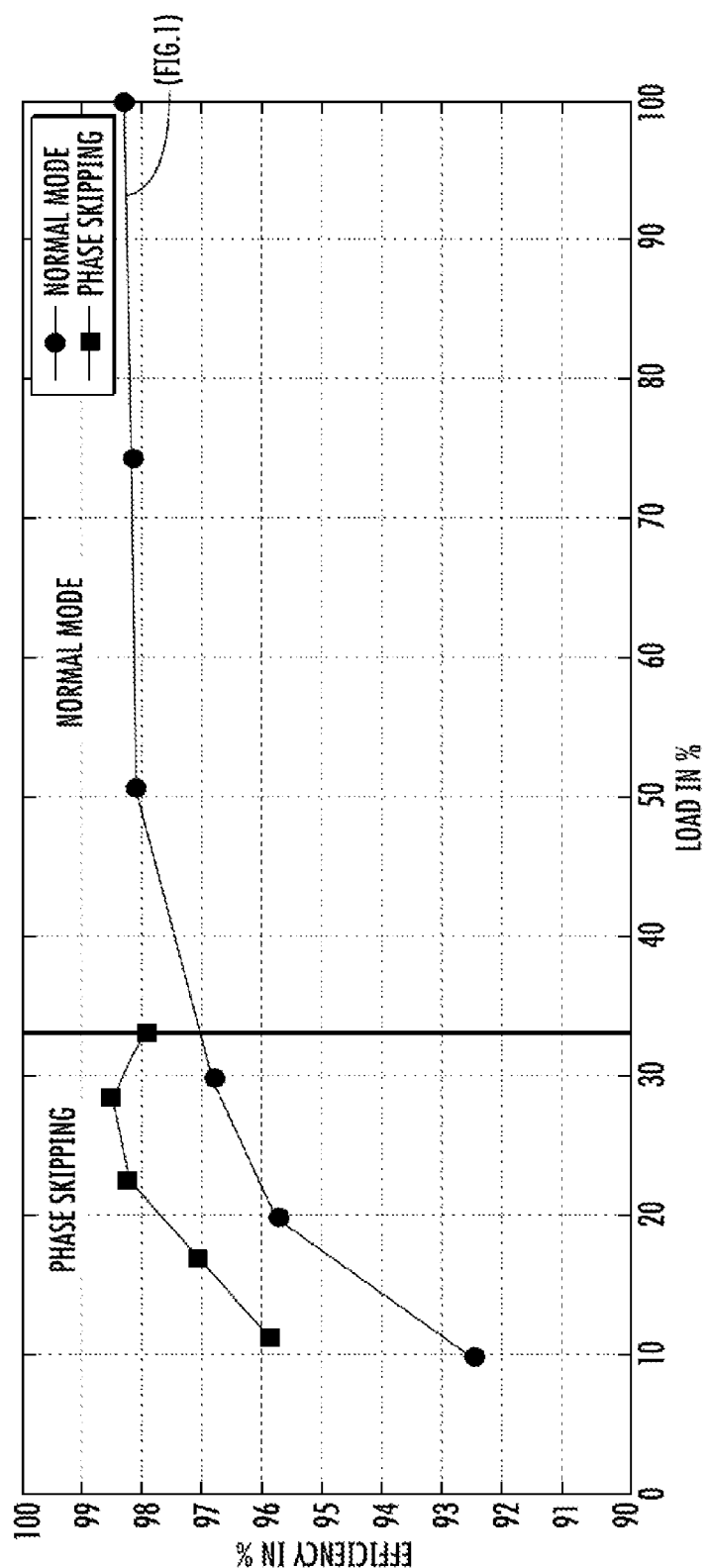
FIG. 5 shows example micro-inverter efficiency performance in both normal control and disclosed phase skipping mode, according to an example embodiment, where comparison is made with FIG. 1.

FIG. 5 shows micro-inverter power efficiency performance during both normal mode control (FIG. 1 copied therein) and disclosed phase skipping mode control which is shown implemented from about 10% to 33% of the full load %. It can be seen that disclosed phase skipping improves the power conversion efficiency of the micro-inverter by about 3.5% effectively halving the power loss when operating between 10% and 33% of the full load % over the power conversion efficiency when using the conventional normal mode of operation independent of the load level.

Figure 6:
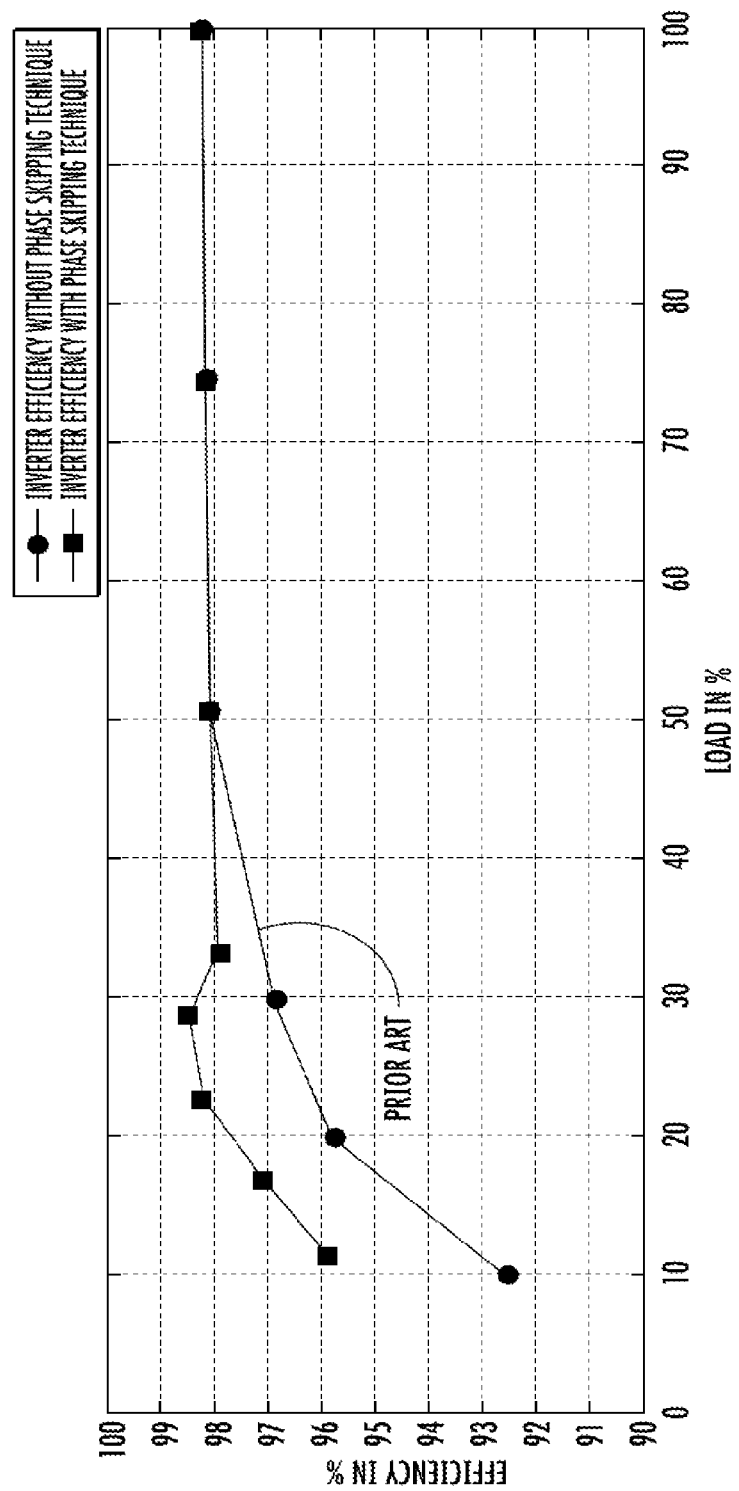
FIG. 6 shows the comparative efficiency performance between a conventional micro-inverter which does not employ disclosed phase skipping and one which employs disclosed phase skipping according to an example embodiment.

FIG. 6 shows the comparative efficiency performance between a conventional micro-inverter which does not employ disclosed phase skipping and one with the same circuit configuration which employs disclosed phase skipping across loads from 10% to about 50% of the full load %. It can be seen that disclosed phase skipping significantly improves the light load efficiency of the three-phase grid tie micro-inverter.

Figure 7A:
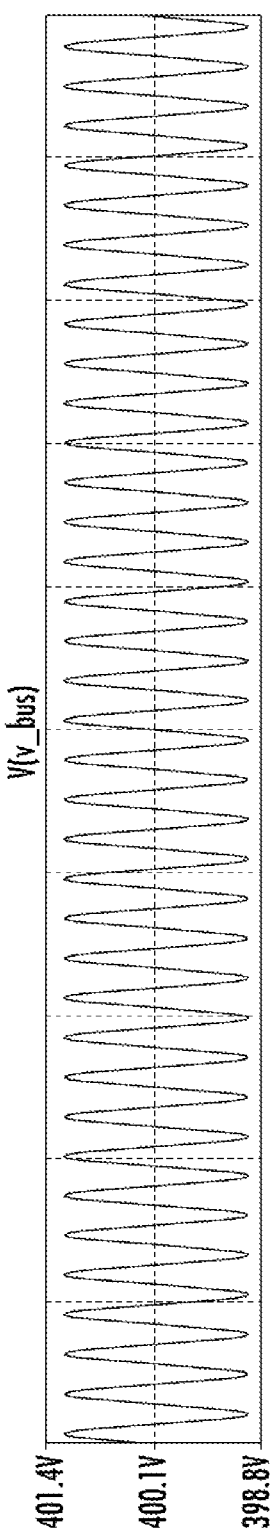
FIGS. 7A and 7B shows simulation results of the DC link voltage (shown as v_bus) and current (shown as I_capacitor), respectively, for normal control, where three phases are active (i.e. used to deliver or transfer or process power).
Figure 7B:
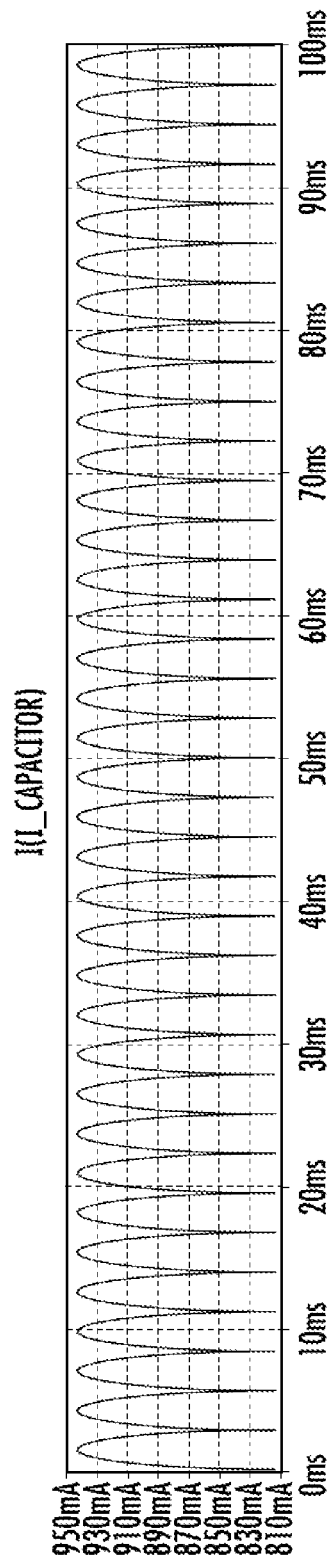
Figure 8A:
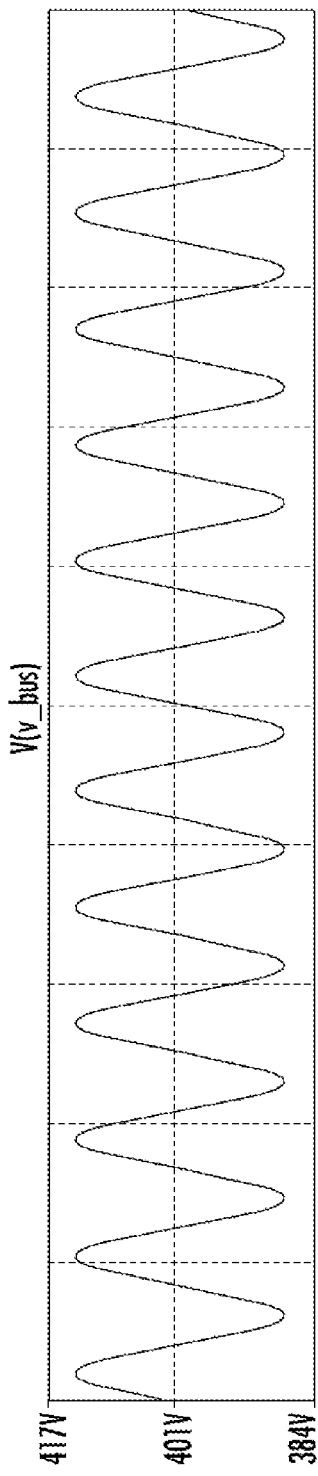
FIGS. 8A and 8B shows simulation results of the DC link voltage (shown as v_bus) and current (shown as I_capacitor), respectively, for disclose phase skipping where only one of the 3 Phases is active, according to an example embodiment.
Figure 8B:
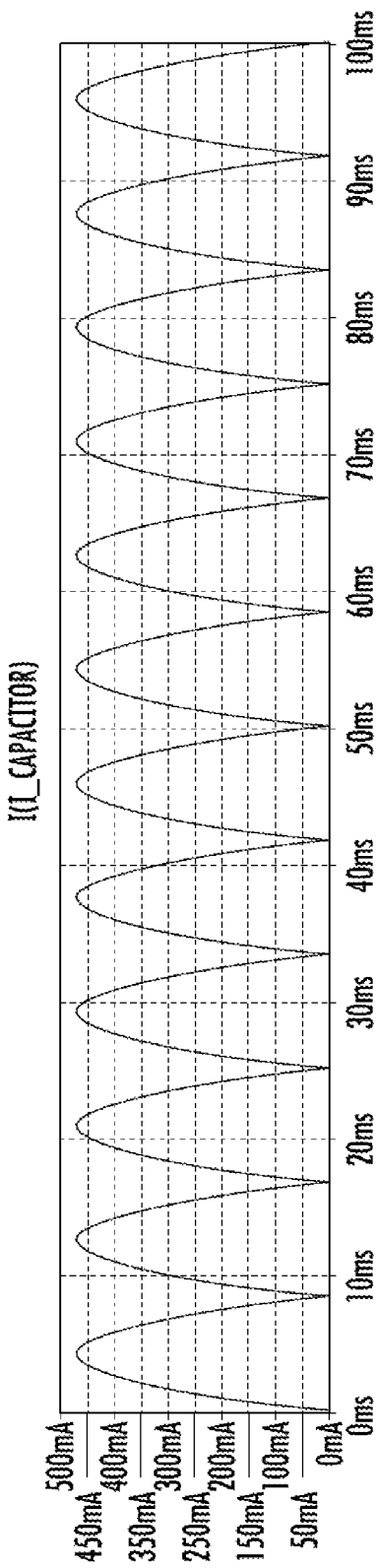

FIGS. 7A and 7B shows simulation results of the DC link voltage (shown as v_bus) and current (shown as I_capacitor), respectively, for conventional normal control of the micro-inverter, where all three phases are shown active. FIGS. 8A and 8B shows simulation results of the DC link voltage (shown as v_bus) and current (shown as I_capacitor), respectively, for disclose phase skipping where only one Phase is shown being active. In the phase skipping mode of operation shown as single phase operation in FIG. 8A, the DC link voltage ripple is slightly higher in amplitude and $\frac{1}{3}^{rd}$ of the frequency compared to the waveform for the normal mode of operation shown in FIG. 7A (where all three phases are operational). This increase in ripple amplitude of DC link voltage may be accommodated by using a higher DC link capacitance. A value of DC link capacitance can be selected such that just the minimum amount of energy storage needed for successful operation of the DC/AC inverter 220 in disclosed Phase Skipping mode is available.

A technique is now described to avoid phase unbalance that can be introduced into the grid 225 which can potentially result from disclosed phase skipping. According to National Electric Code® 705.100 "Three-phase inverters and 3-phase ac modules in interactive systems shall have all phases automatically de-energized upon loss of, or unbalanced, voltage in one or more phases unless the interconnected system is designed so that significant unbalanced voltages will not result". The National Electrical Code (NEC), or NFPA 70, is a regionally adoptable standard for the safe installation of electrical wiring and equipment in the United States. A system level control scheme is described below relative to FIG. 9 to ensure disclosed phase skipping does not violate the NEC or a similar regulation.

Disclosed three-phase micro-inverters can find a variety of applications including in low power PV farm applications and high power residential applications. In both of these applications there may be a need of centralized controller which communicates with all the micro-inverter modules (e.g., micro-inverter 300 shown in FIG. 3A) for power monitoring, control and fault detection. This centralized controller can also ensure that there is essentially no phase unbalance during the phase skipping mode of operation.

Figure 9:
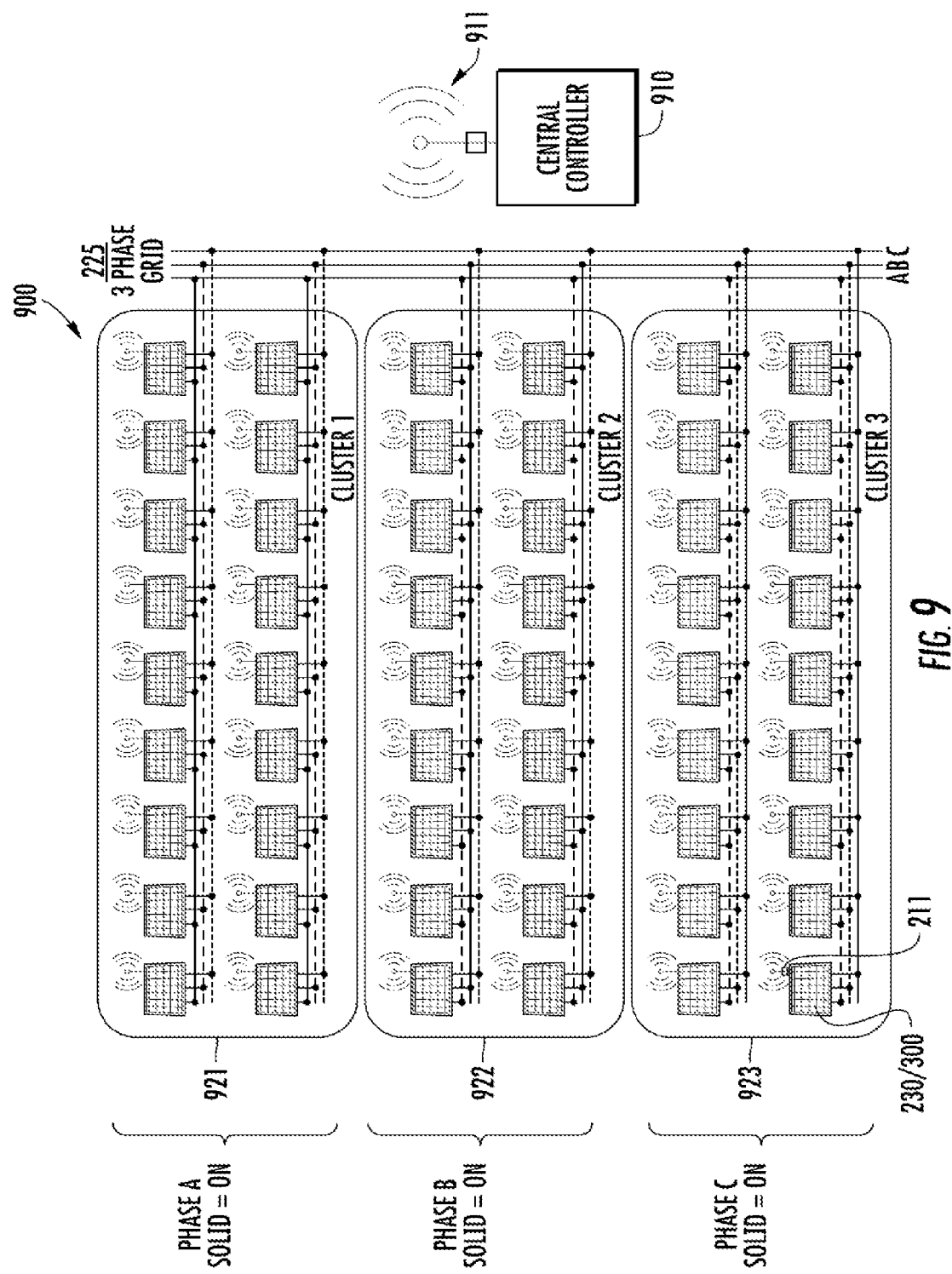
FIG. 9 shows an example low power PV farm including a central controller such as MCU where all the micro-inverters of the PV Farm are operating in phase skipping mode due to low light conditions, according to an example embodiment. The central controller divides the farm into 3 clusters with each cluster injecting power into a phase different from the other cluster, which reduces phase power imbalance due to injection of power into one out of three phases in the Phase Skipping mode of operation.

FIG. 9 shows an example low power PV farm 900 including a central controller 910 such as a MCU where all the micro-inverters 300 of the PV Farm are operating in phase skipping mode due to low light conditions. The central controller 910 and variable power sources 230 coupled to micro-inverters 300 (power source 230/micro-inverter 300) are each shown having an associated wireless transceiver and antenna, shown as 911 and 211, respectively. The central controller 910 can assess the power balance on each of the 3 Phases and through wireless control signals communications to the modules 230/300 comprising power source 230 and micro-inverter 300 of the PV Farm 900 and divide the entire PV farm 900 into 3 equal (or substantially equal) sized (in terms of power) clusters shown as 921 (cluster 1), 922 (cluster 2) and 923 (cluster 3). Each cluster 921, 922 and 923 can be commanded by the central controller 910 to inject power into a specific phase for, for example as shown cluster 921 to Phase A of the grid 225, cluster 922 to Phase B of the grid 225 and cluster 923 to Phase C of the grid 225. This distributed form of power injection reduces phase power imbalance caused to due to injection of power into one out of three phases in disclosed Phase Skipping mode of operation. The central controller 910 can thus ensure that there is essentially no unbalance on the three-phase system.

Similarly in residential applications, all the modules within a certain radius can communicate to a central controller. During light load operation, this central controller 910 can divide all the modules 230/300 within its radius into 3 clusters and command all three clusters to inject power into a specific phase.

Advantages of three-phase DC/AC inverters implementing disclosed phase skipping control include significant improvements to light load efficiency DC to AC power conversion. Existing three-phase DC/AC inverters are not known to provide any technique to improve light load efficiency. As demonstrated herein, disclosed phase skipping control for a three-phase micro-inverter boosts the light load efficiency by about 3.5% to 4%, effectively halving the power loss. A technique is also disclosed to compensate for the likely cause of unbalance between the three phases because of selective injection of power through individual phases during disclosed phase skipping.

With the rapid growth of PV power system in recent years, more and more large-scale PV power plants are being built. Wind and tidal power systems may follow. In 2014 there is more than 3.6 GW installed PV power and this number is rapidly increasing. Large scale PV power plants are based on the centralized inverter technology or string inverter technology which are unable to maximize energy harvest for each PV panel. They also operate at hazardous DC voltages which negatively impact installation and maintenance costs.

A PV power plant architecture based on disclosed three-phase micro-inverters implementing disclosed phase skipping can overcome these shortcomings and can be advantageous in small scale top-roof applications as well as large scale PV power plants. Since efficiency is one of the most important attributes of a solar, wind or tidal power system it is important to convert available energy from PV panel with maximum efficiency. The above described three-phase micro-inverters including disclosed phase skipping will help maximize the amount of power harvested from the PV panel or wind/tidal turbine(s) under all environmental conditions.

The disclosed control technique including phase skipping can generally be extended to any multiphase DC/AC inverters thereby resulting in significantly higher light load efficiency. If the boundaries of the each level of control technique are properly designed, then it may result into a constant high efficiency on the entire load span of the inverter.

Given the significantly improved light load efficiency provided by disclosed embodiments, time-varying output power systems including solar systems having PV panels such as three-phase solar farms, and commercial buildings that use string or a central inverter can be benefited. Other power systems that include significantly time-varying output power sources including wind power systems, tidal power systems, and general AC-DC charging systems, such as three-phase industrial AC-DC chargers when the batteries are close to being fully charged (light load), can also benefit.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A DC/AC inverter, comprising:
a three-phase DC/AC inverter including first, second and third phase circuitry coupled to receive electrical power generated from a power source;
a controller coupled to a control input driver for each of said first, second and third phase circuitry (control input drivers), said controller including an associated memory storing a phase skipping control algorithm, wherein said controller is coupled to receive updating information including a current and a voltage to provide a DC power level generated by said power source;
wherein said control input drivers are coupled to control inputs of said first, second and third phase circuitry, said control input drivers configured for receiving phase skipping control signals from said controller and outputting mode selection signals configured to dynamically select an operating mode for said DC/AC inverter from a Normal Control operation and a Phase Skipping Control operation which have different power injection patterns through said first, second and third phase circuitry depending upon said DC power level,
wherein said Phase Skipping Control operation shuts down one or two of said first, second and third phase circuitry while operating at least one remaining one of said first, second and third phase circuitry.

2. The DC/AC inverter of claim 1, wherein said DC/AC inverter is controlled to operate in said Normal Control operation when said DC power level is above a predetermined power level, and said Phase Skipping Control operation when said DC power level is below said predetermined power level.

3. The DC/AC inverter of claim 1, wherein said controller comprises a micro-controller unit (MCU).

4. The DC/AC inverter of claim 1, wherein said first, second and third phase circuitry each comprise first and second MOSFET switches stacked in series.

5. The DC/AC inverter of claim 2, wherein during said Normal Control operation power injection occurs into all said first, second and third phase circuitry and said Phase Skipping Control operation includes ceasing power injection in at least one of said first, second and third phase circuitry.

6. A three-phase power inverter, comprising:
a DC/DC converter having an input for receiving electrical power from a power source and an output coupled to a mains side three-phase DC/AC inverter including first, second and third phase circuitry;
a controller coupled to a control input driver for each of said first, second and third phase circuitry (control input drivers), said controller including an associated memory storing a phase skipping control algorithm, wherein said controller is coupled to receive updating information including a current and a voltage to provide a DC power level generated by said power source;
wherein said control input drivers are coupled to control inputs of said first, second and third phase circuitry, said control input drivers configured for receiving phase skipping control signals from said controller and outputting mode selection signals configured to dynamically select an operating mode for said DC/AC inverter from a Normal Control operation and a Phase Skipping Control operation which have different power injection or processing patterns through said first, second and third phase circuitry depending upon said DC power level,
wherein said Phase Skipping Control operation shuts down one or two of said first, second and third phase circuitry while operating at least one remaining one of said first, second and third phase circuitry.

7. The three-phase power inverter of claim 6, wherein said Normal Control operation includes power injection into all said first, second and third phase circuitry and said Phase Skipping Control operation includes ceasing power injection in at least one of said first, second and third phase circuitry.

8. The three-phase power inverter of claim 6, wherein said DC/DC converter is configured to implement Maximum Power Point Tracking (MPPT) in both said Normal Control operation and said Phase Skipping Control operation.

9. The three-phase power inverter of claim 6, wherein said DC/AC inverter is controlled to operate in said Normal Control operation when said DC power level is above a predetermined power level, and said Phase Skipping Control operation when said DC power level is below said predetermined power level.

10. The three-phase power inverter of claim 6, wherein during said Normal Control operation power injection occurs into all said first, second and third phase circuitry and said Phase Skipping Control operation includes ceasing power injection in at least one of said first, second and third phase circuitry.

11. The three-phase power inverter of claim 6, wherein said controller comprises a micro-controller unit (MCU).

12. The three-phase power inverter of claim 6, wherein said first, second and third phase circuitry each comprise first and second MOSFET switches stacked in series.

13. A method of power conversion, comprising:
comparing a DC power level generated by a power source that generates electrical power obtained from a current and a voltage to a predetermined power level, and
dynamically controlling a 3-phase DC/AC inverter including first, second and third phase circuitry to operate in a Normal Control operation where power injection occurs into all said first, second and third phase circuitry when said DC power level is above said predetermined power level, and a Phase Skipping Control operation including ceasing power injection in one or two of said first, second and third phase circuitry while operating at least one remaining one of said first, second and third phase circuitry when said DC power level is below said predetermined power level.

14. The method of claim 13, wherein said predetermined power level is less than 33% of a full load capacity of said 3-phase DC/AC inverter.

15. The method of claim 13, wherein said power source comprises a plurality of photovoltaic (PV) panels or at least one wind turbine or at least one tidal turbine.

16. The method of claim 13, wherein said power source comprises a plurality of photovoltaic (PV) panels each having a dedicated one of said 3-phase DC/AC inverter (dedicated 3-phase DC/AC inverter), and wherein said dynamically controlling comprises a central controller including a wireless transceiver with an antenna transmitting wireless signals to implement said Normal Control operation or said Phase Skipping Control operation.

17. The method of claim 16, wherein said plurality of photovoltaic (PV) panels having said dedicated 3-phase DC/AC inverter are divided into first, second and third clusters to implement said first, second and third phase circuitry.

18. The method of claim 16, wherein a DC/DC converter is coupled to receive said electrical power from said power source, and wherein said DC/DC converter is configured to be controlled to implement Maximum Power Point Tracking (MPPT) in both said Normal Control operation and said Phase Skipping Control operation.

* * * * *